United States Patent [19]

Hoult

[11] Patent Number: 4,540,185
[45] Date of Patent: Sep. 10, 1985

[54] GAS-LUBRICATED SEAL FOR SEALING BETWEEN A PISTON AND A CYLINDER WALL

[76] Inventor: David P. Hoult, Box 89, Wellesley, Mass. 02181

[21] Appl. No.: 620,159

[22] Filed: Jun. 13, 1984

[51] Int. Cl.³ .................. F16J 9/00; F16J 15/40; F16J 9/08
[52] U.S. Cl. .................. 277/174; 277/27; 277/216
[58] Field of Search .......... 277/27, 138, 151, 173–175, 277/177, 207 R, 216

[56] References Cited

U.S. PATENT DOCUMENTS

| 3,347,555 | 10/1967 | Norton | 277/177 X |
| 3,704,893 | 12/1972 | Hill | 277/216 X |
| 3,926,444 | 12/1975 | Gripe et al. | 277/177 |
| 4,470,375 | 9/1984 | Showalter | 277/216 X |
| 4,470,388 | 9/1984 | Showalter | 277/216 X |

FOREIGN PATENT DOCUMENTS

| 419751 | 3/1967 | Switzerland | 277/177 |
| 750948 | 6/1956 | United Kingdom | 277/216 |

Primary Examiner—Robert S. Ward
Attorney, Agent, or Firm—H. Eugene Stubbs

[57] ABSTRACT

A piston-cylinder seal uses gas for a lubricant and has a runner supported on a gapless structure and placed in the space between the piston and the cylinder wall. The runner is deformed elastically under the influence of the operating pressures to follow and compensate for variations in the piston-cylinder fit and maintain a seal.

5 Claims, 4 Drawing Figures

GAS-LUBRICATED SEAL FOR SEALING BETWEEN A PISTON AND A CYLINDER WALL

The government has rights in this invention pursuant to Contract No. DE-ACO 2-80ER10743 awarded by the U.S. Department of Energy.

BACKGROUND OF THE INVENTION

The oil lubricated rings which are conventionally used for sealing between between a piston and a cylinder have several disadvantages: the viscous friction of the oil between the ring and the cylinder produces a significant power loss; also the oil does not stand up to the high temperatures of certain advanced engine designs using ceramic liners, thus impeding the implementation of such designs. Other seals have been used which operate without lubrication. While these can operate at high temperatures, they generally have the disadvantages of high wear against the cylinder wall as well as having high friction.

SUMMARY OF THE INVENTION

A central problem in the design of piston-cylinder seals is that as a result of manufacturing tollerances, thermal expansion, and other causes, the space between a piston and a cylinder is variable and the amount of variation is larger than the spacing required for a good seal. An effective sealing mechanism must therefore be dynamic and follow and compensate for the irregular variations in the piston-cylinder spacing. In the conventional oil lubricated piston ring, the ring resides in a slot in the cylinder and is elastically loaded so that it presses outwards from the piston toward the cylinder wall. The outward motion of the ring is stopped when the ring encounters an oil film on the wall surface (or sometimes the wall itself if the oil film is inadequate). In any case, the ring continuously moves in an out, adjusting to the irregularities of the piston-cylinder fit and maintaining a very small space between the ring and the cylinder wall. The changing diameter of the ring as it moves in and out is accomodated by a split at some point in the ring periphery.

An essential requirement for the proper operation of the conventional oil lubricated seal is that the average pressure in the oil film between the ring and the cylinder wall increase when the distance between ring and cylinder decreases. This is necessary to generate a force to stabilize the position of the ring: if the space between the ring and wall increases because of an irregularity, the oil film average pressure diminishes and allows the elastic force in the ring to push the ring outward; if the space decreases, the oil film pressure increases and pushes the ring back against the elastic force. Liquid lubricants and in particular oil generally have the requisite properties to provide this stabilizing action, with average pressure increasing when the film becomes thinner, and this accounts for the widespread success and use of the conventional ring seals. This property of oil lubricants is commonly modeled by assuming the oil cavities when it experiences less than atmospheric pressure. It has been found however, that gases, which do not cavitate, do not function satisfactorily as lubricants in the conventional ring design because they do not produce an increasing average pressure with decreasing spacing over a satisfactory range of operating conditions.

I have discovered that a gas lubricant, although not providing a net radial force which can be used to stabilize the radial position of a variable radius ring, can be made to provide a force couple which rotates a seal element of a novel seal and which stabilizes the orientation of this seal element so as to maintain a satisfactory sealing space between piston and cylinder wall as the piston moves along the cylinder.

My invention features a seal with an annular support member without a gap shaped and dimensioned for fitting around a piston, an annular runner affixed to the support member so as to lie in a clearance space between a piston and a cylinder wall. The runner has upper and lower wing portions extending respectively above and below the support structure, the upper wing portion having a back surface exposed to the pressure of gas above the seal, and the lower wing portion having a back surface exposed to the pressure of gas below the seal. The runner has an outwardly convex contoured surface extending from the distal end of the upper wing to the distal end of the lower wing, which defines a channel between a cylinder wall and the seal, the portion of the contour surface approaching most closely to the cylinder wall being a sealing zone. The contoured surface is exposed to pressure of gas leaking through the channel, and pivots elastically with respect to the support member in response to moments generated by pressure forces on surfaces of the wings. The center of curvature of the sealing zone is above the center of rotation of the runner. The dimensions and elastic properties of the seal are mutually selected with regard to operating pressures and diameter of the piston so that the runner, as seen in cross section, rotates differentially in response to varying gas pressures in the channel to advance and retract the sealing zone towards and from a cylinder wall and thereby maintain an effective sealing of the piston to the cylinder wall as the piston moves along the cylinder while avoiding rubbing contact between the seal and the cylinder wall.

The invention may additionally feature a plurality of skewed slots distributed around the perimeter of the runner for reducing the effective stiffness of the runner, and a support member shaped to fit within a circumferential groove in a cylinder with clearance for sliding therein.

DETAILED DESCRIPTION

Figure 1:
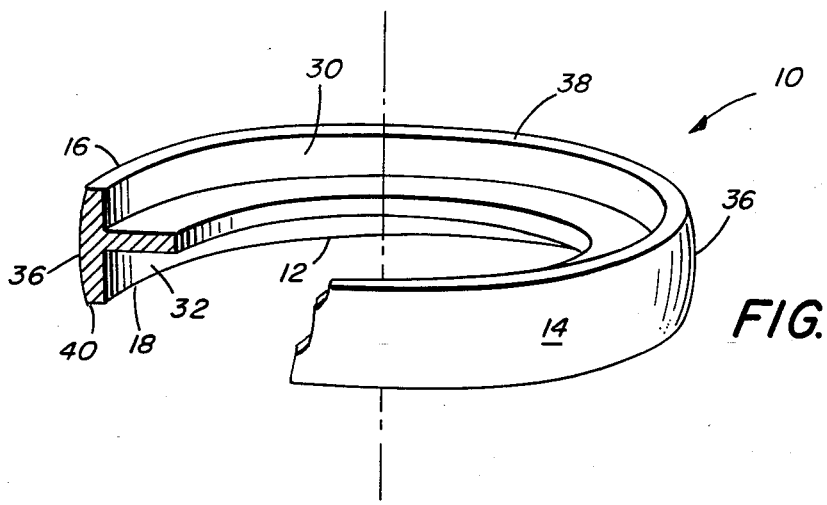
FIG. 1 shows in perspective view and with some portions broken away a seal according to the invention.

Referring to the Figures, seal 10, according to the invention, has annular support member 12 with no gap therein to which is attached at transition region 20 runner 14. Runner 14 has an upper wing portion 16 and a lower wing portion 18 extending respectively above and below transition zone 20. ("Upper" is herein taken to designate the direction toward the combustion chamber or high pressure side of a piston, while "lower" designates the crankcase or low pressure side, corresponding to the orientation of all Figures.)

Figure 2:
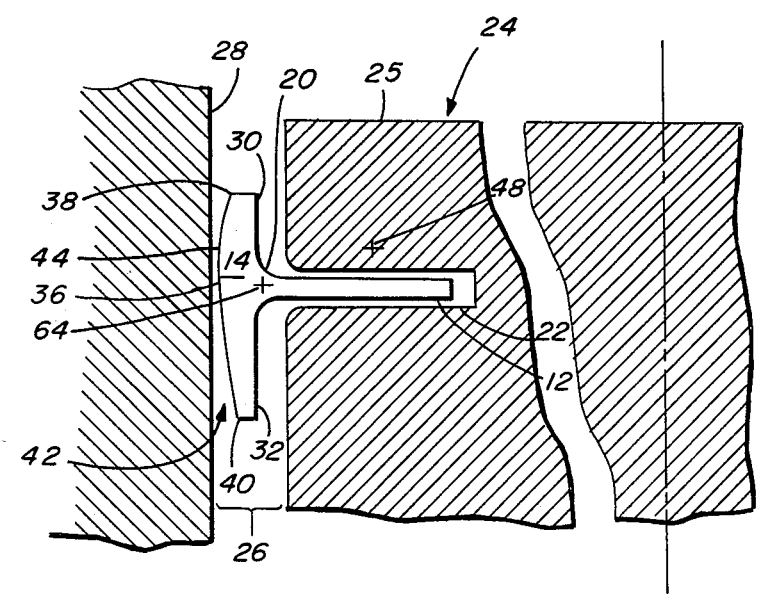
FIG. 2 shows a cross sectional view of the seal of FIG. 1 installed between a piston and a cylinder wall.

In its installed position on piston 24 with piston face 25, shown in FIG. 2, the support member 12 lies in circumferential groove 22 of piston 24, and runner 14 lies in clearance space 26 between piston 24 and cylinder wall 28. Upper wing portion 16 has a back surface 30 exposed, when installed, to the pressure of gas in the combustion chamber above the seal 10 and lower wing portion has a back surface 32 exposed to the pressure of gas in the crankcase chamber below seal 10. Runner 14 has an outwardly convex contoured surface 36 extending from the distal end 38 of wing portion 16 to the distal end 40 of wing portion 18. Contoured surface 36 when installed as shown in FIG. 2, faces cylinder wall 28 and defines channel 42 between the seal and the cylinder wall, the portion of contoured surface 36 approaching most closely to cylinder wall 28 providing sealing zone 44. The position of the center of curvature of contoured surface 36 in sealing zone 44 as seen in the cross section of FIG. 2 is identified by the cross 48.

Figure 3:
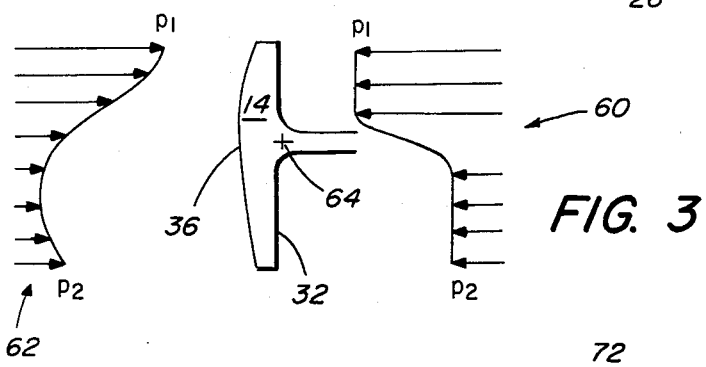
FIG. 3 shows the pressure distribution on the surface of the seal of FIG. 1.

The operation of the seal can be explained with reference to FIG. 3. Suppose the pressure above the piston is higher than that in the crankcase chamber. The piston may be either moving downwards as in the power stroke or upwards as in the compression stroke in an internal combustion engine. The back surface 30 of upper wing portion 16 is exposed to the higher pressure of the combustion chamber while the back surface 32 of lower wing 18 is exposed to the lower pressure of the crankcase resulting in the pressure distribution over the back surface of the runner identified as 60 in FIG. 3. The contour surface 36 of the runner is exposed to the pressure of the small flow of gas leaking through the channel 42 between the runner 14 and the cylinder wall 28 which has the general form shown as 62 in FIG. 3. It may be particularly noted that the pressure of the back side of the runner produces both a net force to the left and a net moment in the counter clockwise direction while the pressure on the front of the runner produces a force to the right and a clockwise moment (directions and rotations being referred to FIG. 3). The net force from combining the front and back forces tends to move the runner in the radial direction, but radial motion of the runner as a whole is restrained by the support structure 12 so that the net force on the runner produces no significant radial motion. (When the structure 12 is without a gap it is effective in providing this restraint.) The net moment of the pressure forces tends to rotate the runner and this rotation is constrained by piston groove 22. (The clearances shown in FIG. 2 are greatly exaggerated.) The result of the net pressure moment is to elastically deform the seal in a way which may be approximately described as a rotation of the runner about a rotation center 64 situated in the transition region 20. This rotation is accompanyed by strains primarily in the transition region and in the tips of the runner wings and is accordingly resisted by elastic forces.

The pressure distribution 60 on the back of the runner is not influenced by small variations of the spacing in channel 42, so that, for given conditions of pressure in the firing chamber and crankcase, it remains the same. The pressure distribution on the contoured surface, in contrast, is considerably altered with small changes in the spacing in channel 42. In particular, it has been found that the moment of the pressure on the contoured surface rises as the channel 42 becomes narrower. Thus, if during the movement of the piston along the cylinder, the channel 42 becomes narrower because of some irregularity in the piston-cylinder fit, the front-side moment will increase and cause a slight clockwise rotation of the runner about rotation center 64. Because the center of curvature 48 of the sealing zone is above the rotation center 64, this rotation will open the space between the sealing zone and the cylinder wall to compensate for the irregularity of fit.

Specific dimensions and elastic properties of the seal should be chosen with regard to the cylinder diameter, the ranges of operating pressures and temperatures above the piston in accordance with the general principles indicated above. It is important to have the center of curvature of the sealing zone situated above the rotation center of the runner in operating conditions so that the system will be stable. The lengths of the runner wings should be chosen with regard to the elastic properties of the seal material to produce the required bending moment. The contour should be chosen to place the center of curvature of the sealing zone above the rotation center of the runner and sufficiently distant from it to produce the desired variation in the position of the sealing zone. Techniques for analysis of the deformation of a body to implement these requirements are well known in the engineering art and need no further elucidation here. Specific dimentions for a seal made of steel and suitable for use in an cylinder of 100 mm diameter with operating specifications of 2000 rpm and indicated mean effective pressure of 300,000 pascals are: height of the seal--4 mm; thickness of seal at tips of wings--1 mm; protrusion of the contour above the front of the wing tips--1 mm.

Figure 4:
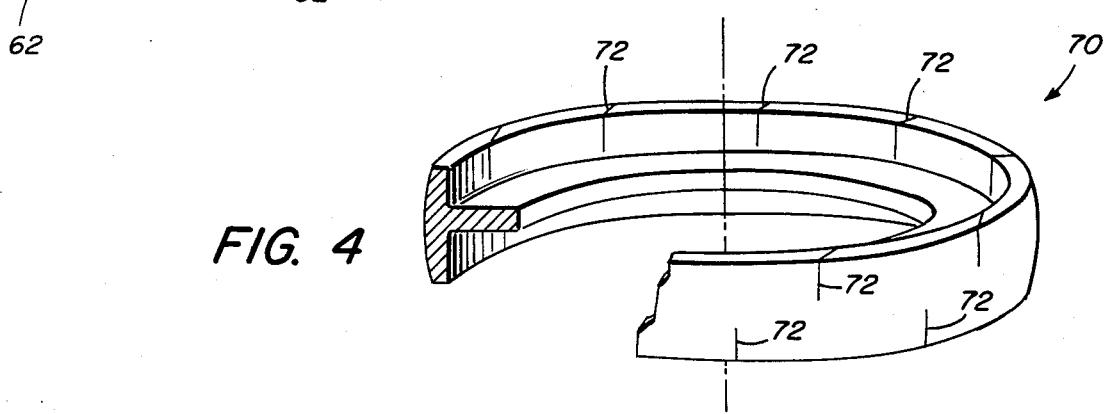
FIG. 4 shows an alternative design for a seal according to the invention.

FIG. 4 shows an alternative design of a runner according to the invention. Seal 70 has a general form like that of the seal previously described with a runner 76 and support structure 74. Skewed cuts are made in the runner to relieve the circumferential stresses in the wing tips when the runner is rotated and therefore reduce the rigidity of the runner and make it easier to rotate. Because the cuts are skewed they will close under the influence of the pressure applied to the runner surfaces and minimize leakage. The design of FIG. 4 may be advantageously used particularly with seals of small diameter where the rigidity tends to be high.

It may be advantageous in some circumstances particularly when a piston cross head is used, to affix the support structure to the piston rather than permitting sliding of the support structure in a piston groove. Other design features such as materials with a composite structure and non-isotropic elastic properties may also be used with advantage in some circumstances. Such choices will be obvious to those skilled in the mechanical design art and are within the scope of the invention.

What is claimed is:

1. A seal for sealing between a piston and a cylinder wall comprising
an annular support member shaped and dimensioned for fitting circumferentially to a piston,
an annular runner affixed to said support member at a transition region situated near the surface of the piston, so as to lie in a clearance space between a piston and a cylinder wall, said runner being free of forces expanding it against said cylinder wall,
said runner having upper and lower wing portions extending respectively above and below said transition region, said upper wing portion having a back surface exposed when installed to the pressure of gas above the seal, and said lower wing portion having a back surface exposed when installed to the pressure of gas below the seal, said runner having an outwardly convex contoured surface extending from the distal end of the upper wing to the distal end of the lower wing, said contoured surface, when installed, facing a cylinder wall and defining a channel between a cylinder wall and said seal, the portion of said contour surface approaching most closely to the cylinder wall being a sealing zone, said sealing zone encircling a piston when installed, said contoured surface being exposed to pressure of gas leaking through said channel, said runner, as seen in cross section, pivoting elastically with respect to said support member around a rotation center in said transition region in response to moments generated by pressure forces on surfaces of said wings, said rotation center being maintained at a invarient distance from the center of the annular support member by said support member, the dimensions and elastic properties of said seal being mutually selected with regard to operating pressures and diameter of the piston so that said runner, as seen in cross section, rotates differentially in response to varying gas pressures in said channel to advance and retract said sealing zone towards and from a cylinder wall and thereby maintain an effective sealing of the piston to the cylinder wall as the piston moves along the cylinder while avoiding rubbing contact between the seal and the cylinder wall.

2. A seal as claimed in claim 1, the wings of said runner having a plurality of skewed cuts distributed around the perimeter reducing the effective stiffness of the runner.

3. A seal as claimed in claim 1 or 2, wherein said support member is shaped to fit within a circumferential groove in a cylinder with clearance for sliding therein.

4. A seal as claimed in claim 1, the center of curvature of said sealing zone as seen in profile being during operating conditions above the center of rotation of the runner.

5. A seal as claimed in claims 1 or 4, wherein said contoured surface has a protrusion above the front of said wing tips of at least one quarter the height of the seal.

* * * * *